Figure 1:
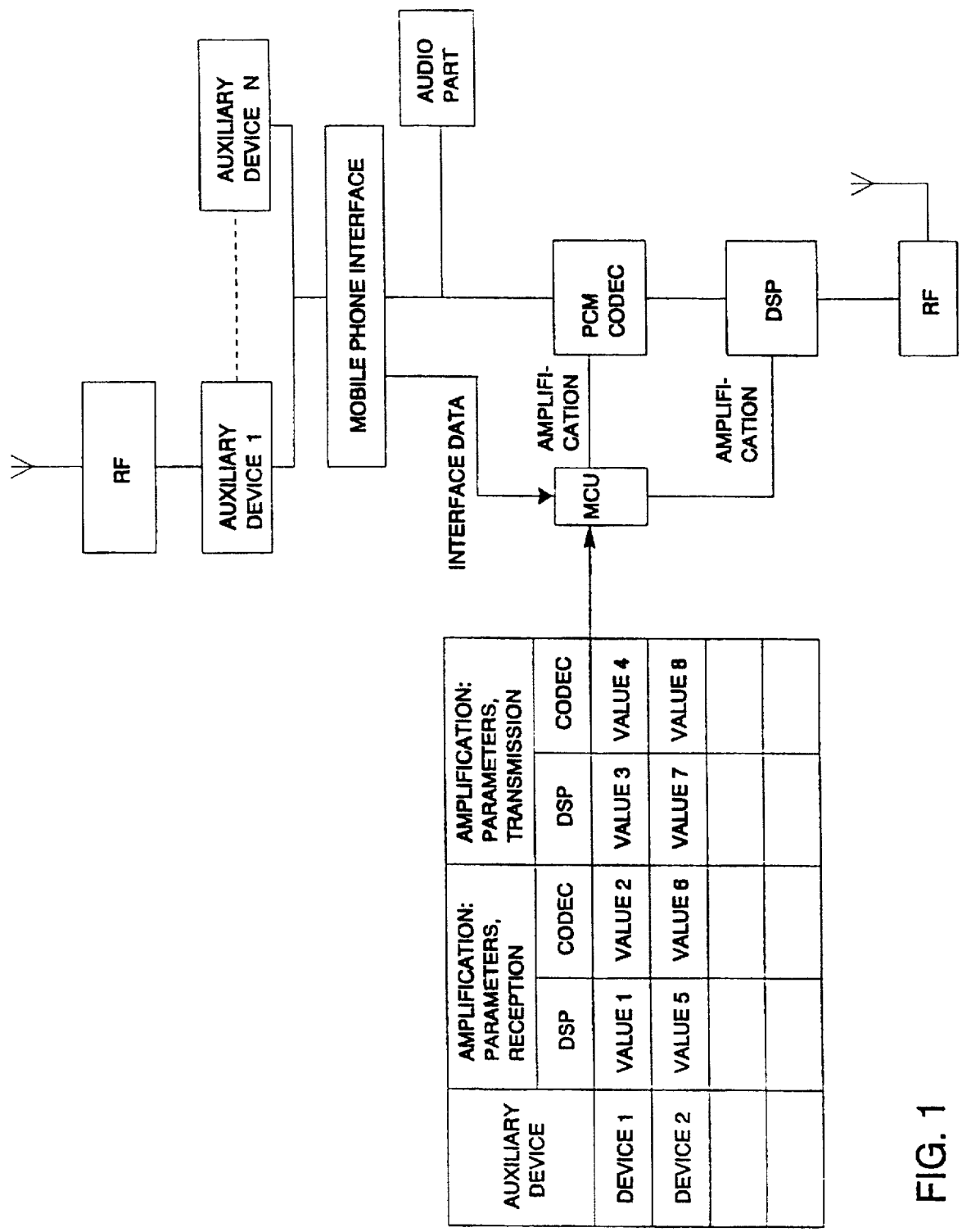

United States Patent [19]

Hallikainen et al.

[11] Patent Number: 5,797,102
[45] Date of Patent: Aug. 18, 1998

[54] ARRANGEMENT FOR ADAPTING THE SIGNAL LEVEL IN MOBILE PHONES

[75] Inventors: Jyrki S. Hallikainen; Matti H. M. Kattilakoski; Pekka H. M. Korkeakangas, all of Oulu, Finland

[73] Assignee: Nokia Mobile Phones Limited, Salo, Finland

[21] Appl. No.: 669,324
[22] PCT Filed: Jan. 5, 1995
[86] PCT No.: PCT/FI95/00005
§ 371 Date: Sep. 10, 1996
§ 102(e) Date: Sep. 10, 1996
[87] PCT Pub. No.: WO95/19096
PCT Pub. Date: Jul. 13, 1995

[30] Foreign Application Priority Data

Jan. 5, 1994 [FI] Finland ............. 940049

[51] Int. Cl.$^6$ ............. H04Q 7/32
[52] U.S. Cl. ............. 455/557; 455/341
[58] Field of Search ............. 455/557, 558, 455/567, 568, 569, 68, 341; 379/165, 447

[56] References Cited

U.S. PATENT DOCUMENTS

| | | | |
|---|---|---|---|
| 4,558,178 | 12/1985 | Yasuda et al. | 455/567 |
| 4,991,197 | 2/1991 | Morris | 455/557 |
| 5,109,402 | 4/1992 | Anderson et al. | 455/557 |
| 5,257,413 | 10/1993 | Warner et al. | 455/557 |
| 5,265,093 | 11/1993 | Dissosway et al. | 370/327 |
| 5,446,783 | 8/1995 | May | 455/557 |
| 5,479,479 | 12/1995 | Braitberg et al. | 455/557 |
| 5,594,952 | 1/1997 | Virtuoso et al. | 455/557 |

FOREIGN PATENT DOCUMENTS 0 435 664 A2  7/1991  European Pat. Off. .

*Primary Examiner*—Willis R. Wolfe
*Attorney, Agent, or Firm*—Perman & Green, LLP

[57] ABSTRACT

The object of the disclosure is an arrangement for adapting the signal level in mobile phones according to the related auxiliary device connected to the mobile phone. The microprocessor (MCU) of the mobile phone receives the connection data from the auxiliary device when the auxiliary device is connected to the mobile phone. In addition, the microprocessor comprises a memory in which the amplification data respectively required has been stored depending on the type of the auxiliary device. On the basis of this the microprocessor transmits the appropriate amplification data to the PCM-codec of the mobile phone and to its digital signal processor (DSP). Numerous auxiliary devices are viable, such as hands-free units, modems, telefaxes etc.

10 Claims, 3 Drawing Sheets

ARRANGEMENT FOR ADAPTING THE SIGNAL LEVEL IN MOBILE PHONES

The object of the present invention is an arrangement for adapting the signal level in mobile phones according to the auxiliary device connected to the mobile phone.

Modern mobile, i.e. cellular phones enable the use of a number of different auxiliary devices connected to the mobile phone. Examples include different hands-free units, modems and telefaxes. Each separate auxiliary device requires a given audio signal level of its own in order to operate properly.

This was generally not a problem in earlier cellular phone generations because the cellular phone was designed so that generally it could use only one specific auxiliary device, whereby the audio signal level of the connection was, of course, set or adapted to the appropriate level. If, for some reason, some other auxiliary device than the one originally intended was used, it was connected to the mobile phone through special adaptation cables.

Since today, as already stated, a number of different auxiliary devices can be used in connection with mobile phones, in principle a number of different sized adaptation cables must also be provided, which naturally renders the efficient use of the system complicated. Therefore, the purpose of the present invention is to eliminate this problem and provide an arrangement which allows different auxiliary devices requiring different audio signal levels to be connected to the same cellular phone and to the same connection without using connection cables which are adapted in various ways.

In order to accomplish this object, the invention is characterized in the details disclosed in appended Claim 1. Preferred embodiments of the invention are disclosed in the dependent Claims.

The basic idea in the invention is thus that the actual mobile phone identifies the connected auxiliary device and sets the signal level of the connection to the required level on the basis of the data stored in its memory.

In this connection it must be pointed out that in one embodiment the identification of an external device is previously known, namely in the case of the type of internal or external power source connected to the mobile phone. It is namely well-known to adapt the charging of a battery according to the identified battery type, on one hand, and to also adapt given user features of the radio telephone according to the respective power source of the radio telephone. However, this known technique does not extend to the degree of presenting the idea of automatically adapting the respective audio level of the cellular phone according to the related auxiliary device.

Figure 2:
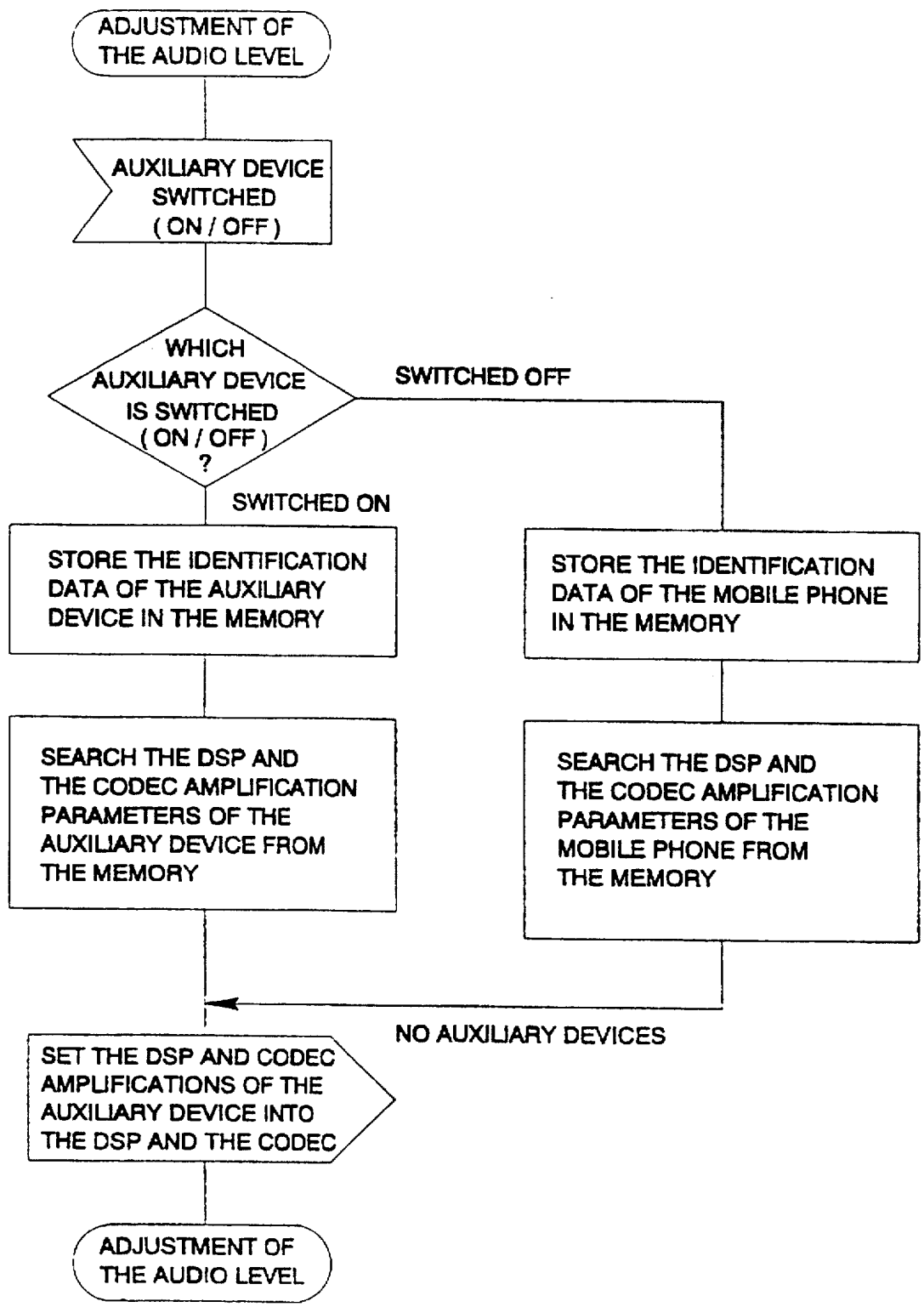
Figure 3:
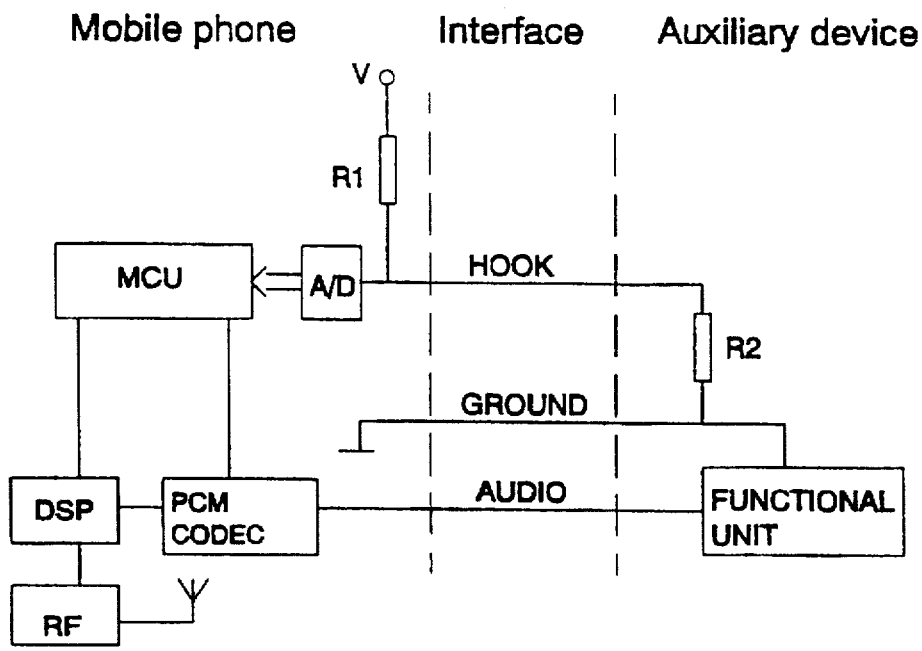
Figure 4:
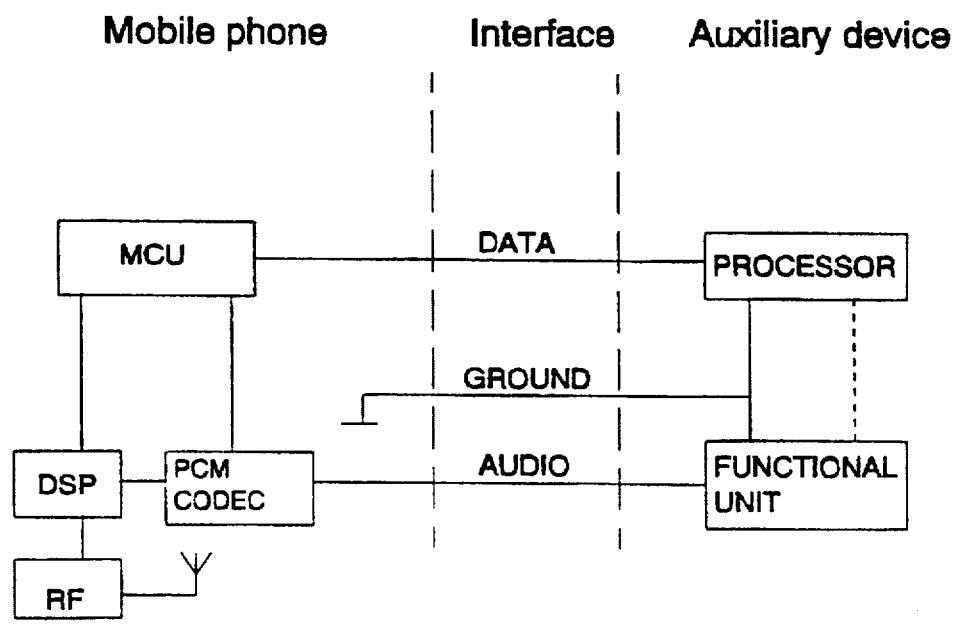

The invention is described in the following in more detail in the form of an example and with reference to the appended drawings, in which:

FIG. 1 shows an embodiment of the adjustment according to the invention in the form of a block diagram, FIG. 2 shows the control event of the adjustment in the form of a flow chart, FIG. 3 shows the identification arrangement of the auxiliary device using a hook signal, and FIG. 4 shows the identification arrangement with a serial interface.

The auxiliary devices in FIG. 1 are marked with reference numbers 1-N. The auxiliary device can also be connected to an antenna through an RF-part, as illustrated in auxiliary device 1. The auxiliary device is connected, via the mobile phone interface, to the cellular phone the parts of which are shown in the lower part of the Figure below the interface.

Microprocessor MCU of the mobile phone receives the data on the type of related auxiliary device that is connected via the interface. The microprocessor is provided with a memory in which data on the amplification respectively required has been stored beforehand, to ensure that the adaptation to the related auxiliary device is appropriate. This amplification data applies to the PCM-codec and/or the digital signal processor DSP of the mobile phone. In the block diagram, the adjustment signal of the amplification is marked from microprocessor MCU to both the PCM-codec and the digital signal processor DSP. According to the block diagram the following data for each auxiliary device has been stored in the memory:

the type identifier of the auxiliary device (device 1, device 2, ...), the amplification parameter of the DSP used in reception (value 1, value 5, ...)

the amplification parameter of the codec used in reception (value 2, value 6, ...)

the amplification parameter of the DSP used in transmission (value 3, value 7, ...), and the amplification parameter of the codec used in transmission (value 4, value 8, ...)

The block diagram further illustrates the audio part and the RF-part of the cellular phone in different blocks, the antenna of the cellular phone being connected to the RF-part.

FIG. 2 shows the operation of the microprocessor in the form of a flow chart.

The microprocessor samples the interface of the auxiliary device to see if the identifier of the auxiliary device has changed. If a new auxiliary device has been connected to the interface, the microprocessor stores in its memory the identification data of the auxiliary device and searches from its memory the amplification parameters of the DSP and the codec on the basis of this data. If, instead, an auxiliary device, which has been previously connected to the interface, is disconnected, the microprocessor stores in its memory the identification data of the telephone and searches the amplification values of the DSP and/or the codec related to the actual telephone on the basis of this data. This can also be done when an auxiliary device, which does not have the said identification, has been connected to the interface. Having searched the correct amplification parameters from its memory, the microcomputer sets the amplification of the DSP and/or the codec on the basis of these parameters.

The auxiliary device identification disclosed herein can be implemented in a number of ways, to a large extent by using the features which already exist in the device. FIGS. 3 and 4 illustrate two arrangements for transmitting identification data via the interface.

In FIG. 3 the identification of the auxiliary device is carried out by what is known as hook-line. The auxiliary device comprises a resistor R2 connected between the hook-line and the ground line, the resistance of which is characteristic to the auxiliary device type in question. When the auxiliary device is connected to a telephone, the telephone supplies power to the hook-line via a resistor R1. One of the poles of the resistor R1 is connected to constant voltage V, whereby the voltage of the hook-line with respect to ground potential is V*R2/(R1+R2). The hook-line is connected in the telephone to the A/D input of an analog-to-digital converter, the output of which is further connected to microprocessor MCU. Since the voltage of the hook-line is proportional to the value of resistance R2 of the auxiliary device, the microprocessor can identify the auxiliary device used by reading the voltage data. Since the resistances comprise a given tolerance, a certain voltage range of the hook-line has to be reserved for each auxiliary device identification. In addition to the tolerances of the resistances, the accuracy and resolution capacity of the A/D converter have an impact on the number of possible auxiliary device types.

The connection of an auxiliary device can be sent to the microprocessor through an interrupt line (not shown in the FIG.), for instance, after which the microprocessor specifies on the basis of the hook-line which device is in question. However, in this case a circuit has to be arranged in the interrupt, providing an interrupt pulse in conjunction with both the connecting and disconnecting of the auxiliary device. Such circuit can be implemented in a known manner using a timer circuit, for instance. Alternatively, the microprocessor can repeatedly read the output of the digital converter in order to inform about the connection or disconnection of the auxiliary device, which in the circuit technology is a more simple solution.

The use of the hook-line for the identification of auxiliary device is an advantageous solution in passive auxiliaries, such as earpieces, which contain no control electronics.

Another alternative for the identification of auxiliary device is shown in FIG. 4 in which information is transferred between a mobile phone and an auxiliary device using a digital serial bus (data) included in the interface. In this case, a given identification code corresponds to each auxiliary device, the code being transmitted by the processor of the auxiliary device to the microprocessor of the telephone. This solution can also employ a separate interrupt line (not shown) to inform the microprocessor about the connection of a new auxiliary device. Thereafter the microprocessor can ask the type specifications of the auxiliary device through the serial line. Alternatively, the auxiliary device can transmit the identification message automatically through the serial line after the connection, whereby the microprocessor of the telephone identifies both the connection and the type of the auxiliary device. Thereafter a possible disconnecting of the auxiliary device can be indicated using repeatedly transmitted messages between the telephone and the auxiliary device.

The identification method based on the use of a serial bus is well-adapted especially to active auxiliary devices which comprise a microprocessor controlling the functions of the auxiliary device, whereby the identification facility does not cause additional expenses in the production of the auxiliary device.

In addition, an audio line included in the interface is marked in FIGS. 3 and 4, an audio signal being transmitted through the line between the PCM-codec of the mobile phone and the functional unit of the auxiliary device.

As already stated in the beginning, the invention can be used to connect auxiliary devices into one interface of a mobile phone without separate adaptation parts, even though the input and output signal levels of the auxiliary devices deviate from each other. Such auxiliary devices can include, for instance, earpieces, hands free units applied in car use, hands free units applied in office use, hand-held telephones, data modems, telefax devices, etc.

The detailed dimensions of the circuit solutions described above are not disclosed in more detail in this description because it is considered to be part of the normal skills of those skilled in the art, which he or she can apply after reading this description.

Only a few exemplifying applications of the method and circuit arrangement according to the invention are disclosed above. Naturally, the principle according to the invention can be modified within the scope of the Claims, for instance with respect to the structural details and areas of use.

We claim:

1. An arrangement for adapting the signal level in mobile phones according to the related auxiliary device connected, characterized in that the mobile phone is adapted to identify the type of auxiliary device respectively connected on the basis of a signal received from the auxiliary device, and adapted to adjust its internal signal levels to suitable levels according to the auxiliary device, and the mobile phone comprises memory means for storing signal level parameters related to the auxiliary devices.

2. An arrangement according to claim 1, characterized in that the interface between the mobile phone and the auxiliary device comprises a first signal line, through which the identification data of the auxiliary device is transmitted, and a second signal line which is used to transmit the audio signal, whereby, on the basis of the identification data received through the fist signal line, the mobile phone is adapted to adjust its internal signal levels related to said audio signal to fit the auxiliary device.

3. An arrangement according to claim 1 characterized in that the auxiliary device is adapted to transmit the identification message using the digital data bus of the telephone.

4. An arrangement according to claim 3, characterized in that the auxiliary device is adapted to repeatedly transmit messages to the telephone, using the digital data bus, and the telephone recognizes the disconnection of the auxiliary device on the basis of the missing message.

5. A circuit arrangement according to claim 1 characterized in that the auxiliary device comprises an electric component, such as a resistor, which is connected between the line used to identify the auxiliary device and called a hook-line in following, and a third line, the resistance comprising an impedance (resistance) specified according to the type of auxiliary device, and the mobile phone identifies the auxiliary device by supplying a current and/or a voltage between the hook-line and the third line and by measuring the voltage and/or current generated in the hook-line.

6. A circuit arrangement according to claim 5, characterized in that the mobile phone comprises an analog-to-digital converter for converting the voltage data of the hook-line into digital data, and the microprocessor reads the digital voltage value to identify the auxiliary device.

7. A circuit arrangement according to claim 6, characterized in that the microprocessor of the telephone repeatedly reads the digital voltage data to indicate a connection or disconnection of the auxiliary device.

8. An arrangement according to claim 1, characterized in that the connection/disconnection of the auxiliary device from the telephone interface causes a change in the state of an interrupt line, after which the microprocessor of the telephone carries out the identification of the auxiliary device.

9. A circuit arrangement according to claim 1, characterized in that the signal level parameters, which are used when no auxiliary device is connected or when no data of the signal level parameters related to the connected auxiliary device has been stored in the memory means, are stored in the memory means of the mobile phone.

10. A circuit arrangement according to claim 9, characterized in that the microprocessor reads from the memory means the signal level parameters related to the connected auxiliary device type or the signal level parameters related to the audio part of the mobile phone and sets the digital signal processor of the telephone and/or the amplification of the codec to values corresponding to the parameters read.

* * * * *